Oct. 8, 1963 H. R. MEADOWS ETAL 3,106,433

LOW TRANSIENT LINEAR SIGNAL GATING CIRCUIT

Filed Feb. 20, 1959

INVENTOR.
Harley R. Meadows
Sidney J. Worley
BY Dwight W. Casey II
Gust & Irish
Attorneys United States Patent Office
3,106,433
Patented Oct. 8, 1963

3,106,433
LOW TRANSIENT LINEAR SIGNAL GATING CIRCUIT

Harley R. Meadows, Fort Wayne, Ind., Sidney J. Worley, Baltimore, Md., and Dwight W. Casey II, Fort Wayne, Ind., assignors to International Telephone and Telegraph Corporation Filed Feb. 20, 1959, Ser. No. 794,679
5 Claims. (Cl. 328—99)

This invention relates to electrical signal gating circuits, i.e., circuits for electrically switching a signal on and off, and more particularly to gating circuits of the type employing valve means, such as vacuum tubes, as the gating or switching element.

In many electronic systems, it is desirable to provide a gating circuit for low level electrical signals, it being further desired that the operation of the circuit be as linear as possible, i.e., with the gate closed and the signal being passed it is desired that the resulting output signal be directly responsive to the input signal. It is further desirable, particularly in the case of linear gating of low level signals, that the gating circuit provide switching transients of minimum amplitude and that any resultant gating pedestal during the gating interval, i.e., with the gate open and the signal not being passed, be as small as possible. It is of course further desirable that the attenuation of the electrical signal with the gate open be as great as possible.

Many types of gating circuits are presently known, the most common forms being diode gating circuits; such gating circuits in general, however, are very non-linear and provide large gating pedestals and switching transients. Various forms of gating circuits employing multi-element tubes have been devised for providing gating pedestal cancellation by turning on one tube while simultaneously turning off another, however, to the best of the present applicants' knowledge, such gating circuits are still subject to large switching transients. Other types of balanced gate circuits have been proposed in which differential circuits are employed to cancel the gating pedestal, one such circuit known to the present applicants utilizing a push-pull gate consisting of two multi-element tubes, the output of one tube being applied to the control grid of a pedestal cancelling tube and the output of the other tube being applied to the cathode of the pedestal cancelling tube; while this circuit has been found quite effective in reducing the gating pedestal and switching transients, it is, however, still non-linear since one of the push-pull tubes looks into the non-linear cathode impedance of the pedestal cancelling tube. In addition, gating circuits utilizing special vacuum tubes have been proposed, such circuits, however, having the disadvantage of not employing standard commercially available components. To the best of the present applicants' knowledge, therefore, the above enumerated problems of non-linearity, gating pedestals, switching transients, and attenuation have never been simultaneously solved in a single gating circuit employing standard components.

It is therefore desirable to provide a gating circuit of the type employing valve devices suitable for gating low-level electrical signals which provides a high degree of linearity of operation thus causing little or no deterioration in the electrical signal passed thereby, very high attenuation to the electrical signals during the gating interval, very low gating transients, and a minimum of gating pedestal during the gating interval. It is further desirable that such a gating circuit be simple employing a minimum number of standard components.

It is therefore an object of this invention to provide an improved gating circuit.

Another object of this invention is to provide an improved gating circuit of the type employing valve devices.

A further object of this invention is to provide an improved gating circuit suitable for gating low level electrical signals, the circuit providing a high degree of linearity, high attenuation during the gating interval, low level gating transients, and a minimum gating pedestal.

Yet another object of this invention is to provide an improved gating circuit possessing the desirable features enumerated above.

Our invention, in its broader aspects, provides gating valve means with a signal input circuit coupled thereto for impressing a signal to be gated thereon and having a signal output circuit coupled to an element thereof. Pedestal cancelling valve means is provided having a gating circuit coupled thereto for impressing a gating signal thereon, the pedestal cancelling valve means being coupled to the gating valve means so that the gating valve means is rendered non-conductive in response to impression of a gating signal on the pedestal cancelling valve means. In order to provide for minimizing the gating pedestal during the gating interval, means, such as an impedance network, are provided coupling an element of the pedestal cancelling valve means to the gating valve means output element, such means being arranged to maintain the potential of the gating valve means output element substantially the same when the gating valve means is conducting and when the same is non-conductive.

In the preferred embodiment of our invention, a pair of three element gating valve means as provided having their control elements connected to a push-pull input circuit thereby impressing the input signal to be gated respectively thereon 180° out of phase. The pedestal cancelling valve means takes the form of a three element valve device with the gating signal being impressed upon its control element, an element of the pedestal cancelling valve means being connected to elements of the gating valve means so that conduction of the pedestal cancelling valve means responsive to the impression of the gating signal thereon cuts off the gating valve means. A push-pull output circuit is coupled to corresponding output elements of the pair of gating valve means and an impedance network connects the output element of the pedestal cancelling valve means to the respective output elements of the gating valve means so that the respective potentials of the gating valve means output elements remain substantially the same when the gating valve means are cut off, i.e., in the presence of the gating signal, and when the gating valve means are conducting, i.e., passing the signal. A differential amplifier having a push-pull input circuit may be coupled to the push-pull output circuit of the gating valve means, thus serving to reduce the gating transients in the output signal.

The above-mentioned and other features and objects of this invention and the manner of attaining them will become more apparent and the invention itself will be best understood by reference to the following description of an embodiment of the invention taken in conjunction with the accompanying drawings, wherein.

Figures 1, 2, 3:
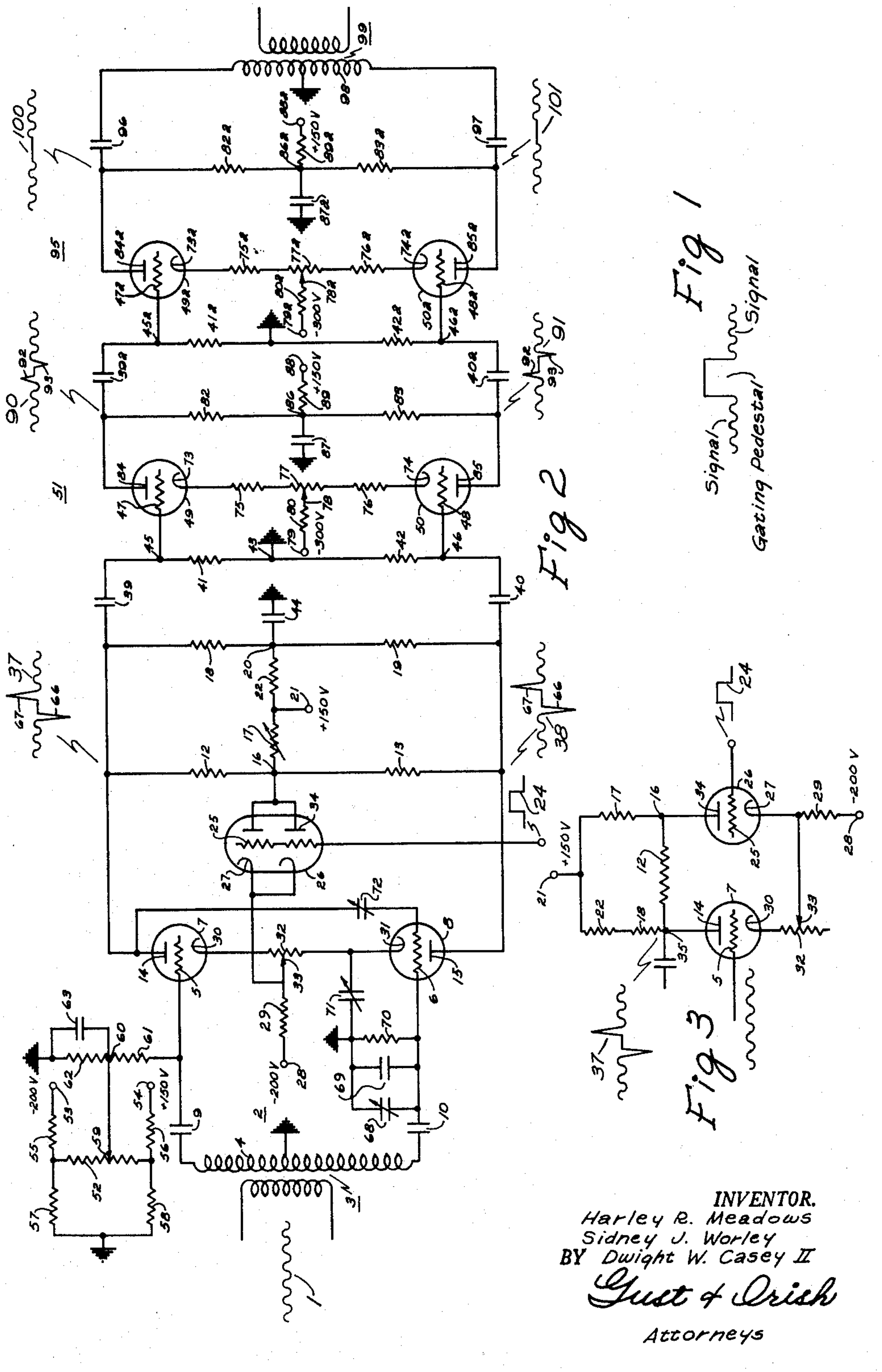
FIG. 1 shows a gating pedestal in a low level electrical signal which the present invention is intended to eliminate.
FIG. 2 is a schematic illustration showing the preferred embodiment of our invention.
FIG. 3 is a fragmentary schematic view showing the essential part of our invention useful in explaining the operation thereof.

Referring now momentarily to FIG. 1 of the drawing, if a negative-going gating pulse is merely applied to the grid of a tube passing an electrical signal (or a corresponding positive-going pulse applied to the cathode), the pulse being of sufficient magnitude positively to cut-off conduction of the tube and thus to gate-off the signal in the output circuit of the tube, the gating pulse, being itself an input signal to the tube, is reflected in the output circuit of the tube, as shown in FIG. 1.

Referring now to FIG. 2, a low level electrical signal 1 to be gated is coupled to a conventional push-pull input circuit 2, which may take the form of a suitable coupling transformer 3 having its secondary winding 4 center-tapped, as is well known in the art. The two ends of the secondary winding 4 of coupling transformer 3 are respectively coupled to control grids 5 and 6 of gating tubes 7 and 8 by means of suitable coupling capacitors 9 and 10. It is thus seen that the signal to be gated is fed 180° out of phase to the control grid elements 5 and 6 of gating tubes 7 and 8 respectively; gating tubes 7 and 8 form the halves of the push-pull amplifier which is used as the gating circuitry.

A pair of resistors 12 and 13 are serially connected across plates 14 and 15 of gating tubes 7 and 8, the midpoint 16 between resistors 12 and 13 being connected to a suitable source of positive plate potential, such as +150 volts by a suitable variable resistor 17. Another pair of resistors 18 and 19 are connected in series across plates 14 and 15 of gating tubes 7 and 8, and the midpoint 20 between resistors 18 and 19 likewise being connected to the source of positive plate potential 21 by resistor 22. It is thus seen that when the gating tubes 7 and 8 are normally conducting plate current is drawn through resistor elements 18, 19 and 22 from the positive source of plate potential 21, the current in resistor elements 18 and 19 being equal, and also through resistor elements 17, 12 and 13, the current flow in resistor elements 12 and 13 likewise being equal.

In order to gate or turn off gating tubes 7 and 8, a gating pulse 24 is applied to the common control grids 25 of pedestal cancelling tube 26, shown here as being of the twin triode type; pedestal cancelling tube 26 is normally in the cut-off or non-conductive condition in the absence of a gating pulse 24. The applied gating pulse 24, being positive-going, causes the pedestal cancelling tube 26 to draw plate current from positive source of plate potential 21 through a parallel resistance circuit comprising resistor 17 as one parallel leg, resistors 22, 18 and 12 as another parallel leg, and resistors 22, 19 and 13 as the third parallel leg. The cathodes 27 of pedestal cancelling tube 26 are connected to a common source 28 of negative potential, such as —200 volts, by a common cathode resistor 29 and it is thus seen that the common cathode current of pedestal cancelling tube 26, which is the sum of the currents flowing in the three above referred to resistance branches, flows through the common cathode resistor 29.

Cathodes 30 and 31 of the gate tubes 7 and 8 are connected together by means of potentiometer 32 having its sliding element 33 connected to the common cathode resistor 29. It will now be seen that when the pedestal cancelling tube 26 is rendered conductive, i.e., gated on, responsive to impression of gating signal 24 on its control grid 25, the resultant cathode current flowing in common cathode resistor 29 causes a sufficient voltage drop thereacross to raise the respective voltages of cathodes 30 and 31 of gating tubes 7 and 8 with respect to their grids 5 and 6 to a level well beyond cut-off of these tubes; adjustment of sliding element 33 of potentiometer 32 permits adjustment of the cathode voltages of cathodes 30 and 31 of tubes 7 and 8 for equality. When the gate tubes 7 and 8 are cut-off responsive to impression of a gating signal 24 on the pedestal cancelling tube 26, the potential of plates 14 and 15 remains the same as when the tubes are normally conductive by virtue of suitable proportioning of the resistance network comprising the resistances 12, 13, 17, 18, 19 and 22, as will hereinafter be more fully described.

Referring now to FIG. 3 in which only one of the gating tubes, i.e., gating tube 7 is shown, along with pedestal cancelling tube 26 and the cooperative part of the resistance network comprising resistors 12, 17, 18 and 22, it will be seen, as explained above, that when pedestal cancelling tube 26 is conducting, plate current is drawn from the source 21 of positive plate potential through a parallel resistance circuit comprising resistor 17 as one parallel branch and resistors 22, 18 and 12 as the other parallel branch. This flow of plate current in pedestal cancelling tube 26 flowing in common cathode resistor 29 provides a sufficient voltage drop thereacross to elevate the potential of cathode 30 of gating tube 7 sufficiently to cut-off that tube. The flow of plate current of tube 26 in the parallel resistance branch 22, 18, 12, however, establishes a definite potential at point 35 to which plate 14 of tube 7 is connected, e.g., resistance elements 22, 18, and 12 in essence form a voltage divider with the potential of point 35 being proportional to the relative values of resistors 22 and 18 on the one hand and resistor 12 on the other hand. When gating pulse 24 is removed from grid 25 of pedestal cancelling tube 26, that tube is rendered non-conductive thereby removing the biasing potential from cathode 30 of gating tube 7 thereby turning tube 7 on. It will now be seen that plate current is drawn by gating tube 7, through a parallel resistance network comprising resistors 22 and 18 on the one hand as one parallel branch and resistors 17 and 12 on the other hand as the other parallel branch. It will now be seen that the values of resistors 12, 17, 22 and 18 can be suitably chosen in the light of the respective plate currents drawn by the tubes 7 and 26 so that the potential of point 35 remains substantially unchanged regardless of whether tube 7 is conducting with tube 26 cut-off or tube 7 is cut-off with tube 26 conducting. It is thus seen that the output signals 37 and 38 contain no gating pedestals since the potentials of their respective plates 14 and 15 remain substantially unchanged whether the gating tubes 7 and 8 are conducting or cut-off.

A push-pull output circuit is coupled to plates 14 and 15 of gating tubes 7 and 8, comprising coupling capacitors 39 and 40 and serially connected resistors 41 and 42 having their midpoint 43 grounded as shown. Midpoint 20 between resistance network resistors 18 and 19 is likewise connected to ground by a suitable capacitor 44 as shown; resistor 22 and capacitor 44 provide power supply decoupling as well as providing the proper D.C. load for gating tubes 7 and 8. Points 45 and 46 respectively intermediate capacitor 39 and resistor 41 on the one hand and capacitor 40 and resistor 42 on the other hand are respectively connected to control grids 47 and 48 of tubes 49 and 50 of differential amplifier 51, a push-pull input to differential amplifier 51 thus being provided. It will be seen that balance between the pedestal cancellation tube 26 and the gating tubes 7 and 8 (during gating is not critical and that if a small pedestal forms (which will be the same in both plates 14 and 15 of gate tubes 7 and 8), these pedestals, being in phase in the push-pull output of the gating tubes 7 and 8, will tend to be reduced by differential amplifier 51.

It will, however, be seen that the pedestal unbalance between gate tubes 7 and 8, i.e., unequal gating pedestals at the plates 14 and 15 of tubes 7 and 8, cannot be compensated for by the differential amplifier 51. Therefore, potentiometer 52 is provided connected between suitable sources of potential 53 and 54, such as −200 volts and +150 volts respectively, by suitable resistors 55 and 56. The ends of potentiometer 52 are also connected to ground by resistors 57 and 58 and its sliding element 59 is connected to midpoint 60 of a voltage divider comprising resistors 61 and 62 connected between grid 5 of gating tube 7 and ground as shown, capacitor 63 being connected across resistor 62. It is thus seen that potentiometer 52 is D.C. coupled to control grid 5 of gating tube 7 thus providing a means for balancing the operation of gating tubes 7 and 8 by adjusting the grid-to-cathode bias of tube 7 provided by potentiometer 52. It will be seen that capacitor 63 by-passes A.C. components and that the use of D.C. coupling of potentiometer 52 permits remote control of the gate balance.

Switching or gating transients 66 and 67 in the output signals 37 and 38 which are equal in shape and amplitude at the plates 14 and 15 of gating tubes 7 and 8 occur because the speed of cut-off of the gating tubes 7 and 8 differs from the speed of turn-on of the pedestal cancellation tube 26. The switching speeds of the gate tubes 7 and 8, in most instances, will be found to be slightly different due to manufacturing tolerances of the individual tubes, and further due to variances in the circuit capacity due to the physical lay-out of the various components. Therefore, trimmer capacitor 68 and fixed capacitor 69 are provided coupling control grid 6 of gating tube 8 to ground, capacitors 68 and 69 being connected in parallel with a suitable resistor 70. Another trimmer capacitor 71 connects cathode 31 of gating tube 8 to ground as shown and yet another trimmer capacitor 72 connects control grid 6 of gating tube 8 to the plate 14 of gating tube 7. The trimmer capacitors 68, 69, 71 and 72 thus serve to equalize the switching speeds of gating tubes 7 and 8 and hence, the gating transients 66 and 67 appearing at the plates 14 and 15 of gating tubes 7 and 8 are made to coincide time wise and can be more effectively cancelled by the differential amplifier 51.

As indicated hereinabove, tubes 49 and 50 form the halves of differential amplifier 51, cathodes 73 and 74 being connected together by serially connected resistors 75 and 76 and potentiometer 77. The sliding element 78 of potentiometer 77 is in turn connected to a suitable source 79 of potential, such as −300 volts, by a suitable resistor 80. Resistors 75 and 76 are the cathode resistors of each half of differential amplifier 51 used to gain linearity through cathode degeneration while resistor 80 is a large valued common cathode resistor used to retain good common mode rejection. Resistors 82 and 83 are serially connected across plates 84 and 85 of differential amplifier tubes 49 and 50, their midpoint 86 being connected to ground by a suitable capacitor 87 and also to a suitable source 88 of positive plate potential, such as +150 volts, by a suitable resistor 89; resistors 82 and 83 are thus the plate load resistors for differential amplifier tubes 49 and 50 and are thus of equal value, while resistor 89 is a common plate resistor used to establish a desired standing load for the differential amplifier tubes 49 and 50. Resistor 89 and capacitor 87 provide power supply decoupling as well as the proper D.C. load for tubes 49 and 50.

The differential amplifier tubes 49 and 50 amplify output signals 37 and 38 from the gating tubes 7 and 8, however, tend to cancel the in-phase gating transients 66 and 67. Potentiometer 77, with its inherent capacity, tends dynamically to balance the two halves of the differential amplifier 51. Since pedestal cancellation is performed at the plates 14 and 15 of gating tubes 7 and 8, the differential amplifier 51 need only have a dynamic range large enough to operate linearly with relatively small signals.

It may be found that the plate output signals 90 and 91 from the plates 84 and 85 of differential amplifier tubes 49 and 50 respectively still contain a certain amount of residual switching transients 92 and 93 due to the common-mode effect of the differential amplifier 51. These residual switching transients, if objectionable, may be substantially eliminated by providing another differential amplifier 95 identical to differential amplifier 51, with its components respectively being identified by numerals bearing the suffix "*a*." Plates **84*a* and 85*a* of tubes 49*a* and 50*a* of the second differential amplifier 95 may be coupled to a conventinal push-pull single-ended output circuit by capacitors 96 and 97 connected to the ends of secondary winding 98 of coupling transformer 99, as is well known in the art. The second differential amplifier 95 will, in common with the first differential amplifier 51, pass the desired signals while tending to cancel any remaining transients 92 and 93 due to the common-mode effect of the first differential amplifier 51, so that the resulting output signals 100 and 101 from the plate 84*a* and 85*a* of the second differential amplifier tubes 49*a* and 50*a* contain no perceptible switching transients. Again, potentiometer 77*a* tends dynamically to balance the second differential amplifier 95 for optimum linearity of operation. It will be observed that the output signals 100 and 101 from tubes 49*a* and 50*a* of the second differential amplifier, in common with the output signals 90 and 91 from the first differential amplifier 51 and 37 and 38 from the gating tubes 7 and 8** are 180° out of phase and thus, may be used either as a push-pull input for another device, or as a single-ended input as shown, as is well known in the art.

The amplifier gate comprising gating tubes 7 and 8, the first differential amplifier 51 comprising tubes 49 and 50 and the second differential amplifier 95 comprising tubes **49*a* and 50*a* are arranged for optimum linearity of operation through the proper amounts of cathode degeneration, i.e., feedback, the choice of the best operating point, and the proper choice of dynamic and static tube loads, as is well known to those skilled in the art. Furthermore, the use of the push-pull configuration, used throughout, further enhances linearity by virtue of cancellation of second harmonics. It will, however, be understood that in cases where the presence of second harmonics in the output signal is not objectionable, the simplified single-ended arrangement of FIG. 3 may be employed; such a single-ended circuit will, however, have larger transients and poorer linearity. The number of differential amplifiers employed depends largely upon the desired reduction of gating transients. Hence, where gating transients need only be moderately reduced, only one differential amplifier may be required and in cases where the gating transients are not in any way objectionable, the differential amplifier may be entirely eliminated. In other cases, however, where reduction of gating transients is of prime importance, several cascaded differential amplifiers, as shown in FIG. 2, may be employed. It will be readily seen that the circuitry affords no loss to signals when the gating tubes 7 and 8 are conducting, i.e., not cut-off, and that the circuit can provide a net gain greater than unity. It will further be readily understood that while triode-type tubes have ben shown, other types of vacuum tubes, such as pentodes may be employed, and further that transistors may be substituted for some or all of the vacuum tubes shown. It will be understood that other types of differential devices such as balanced transformers, may be employed instead of the differential amplifier circuits 51 and 95** shown.

In an actual circuit constructed in accordance with FIG. 2, components having the following values were employed:

| | |
|---|---|
| Tubes **7** and **8** | 5670 |
| Capacitors **9** and **10** ----μf-- | .01 |
| Resistors **12** and **13** ----ohms-- | 2,200 |

| | | |
|---|---|---|
| Resistor 17 | ohms | 10,000 |
| Resistors 18 and 19 | do | 430 |
| Resistor 22 | do | 3,300 |
| Tube 26 | | 6111 |
| Resistor 29 | ohms | 11,000 |
| Resistor 32 | do | 250 |
| Capacitors 39, 39a and 40, 40a | μf | .01 |
| Resistors 41, 41a and 42, 42a | ohms | 100,000 |
| Capacitor 44 | μf | 4 |
| Tubes 49, 49a and 50, 50a | | 6111 |
| Potentiometer 52 | ohms | 10,000 |
| Resistor 55 | do | 130,000 |
| Resistor 56 | do | 100,000 |
| Resistors 57 and 58 | do | 3900 |
| Resistor 61 | do | 100,000 |
| Resistor 62 | do | 1,000 |
| Capacitor 63 | μf | .01 |
| Capacitor 68 | μμf | 8–50 |
| Capacitor 69 | μμf | 27 |
| Resistor 70 | ohms | 100,000 |
| Capacitor 71 | μμf | 1.5–7 |
| Capacitor 72 | μμf | 1.5–7.0 |
| Resistors 75, 75a, and 76, 76a | ohms | 24 |
| Potentiometers 77, 77a | do | 250 |
| Resistors 80, 80a | do | 13,000 |
| Resistors 82, 82a, and 83, 83a | do | 330 |
| Capacitors 87, 87a | μf | 4 |
| Resistors 89, 89a | ohms | 2,700 |
| Capacitors 96, 97 | μf | .01 |

It will now be seen that we have provided an improved gating circuit characterized by its provisions of a high degree of linearity of operation, high attenuation of the electrical signals during gating, low level gating transients, and substantial elimination of the gating pedestal during the gating interval. It will also be readily seen that our improved circuit may equally advantageously be employed to gate a signal "on" as well as to gate a signal "off" as described above.

While we have described above the principles of our invention in connection with specific apparatus, it is to be clearly understood that this description is made only by way of example and not as a limitation to the scope of our invention.

What is claimed is:

1. A gating circuit comprising: a pair of gating valve means each having at least three elements including a control element; a push-pull signal input circuit coupled to said gating valve means control elements and adapted respectively to supply the signal to be gated thereto; a push-pull signal output circuit coupled to corresponding second elements of said pair of gating valve means; pedestal cancelling valve means having at least three elements including a control element; a gating signal circuit coupled to said pedestal cancelling valve means control element for supplying a gating signal thereto; said pedestal cancelling valve means being conductive responsive to application of a said gating signal to said control element thereof and non-conductive in the absence of a gating signal; corresponding third elements of said pair of gating valve means and said pedestal cancelling means being coupled to a first common potential point by common impedance means whereby conduction of said pedestal cancelling valve means responsive to said gating signal causes said pair of gating valve means to be non-conductive thereby gating off said input signal; an impedance network coupling corresponding second elements of said pair of gating valve means and said pedestal cancelling valve means to a second common potential point, said impedance network being proportioned so that the respective potentials of said second elements of said pair of gating valve means are substantially the same when said gating valve means are conducting and when the same are non-conducting whereby a minimum gating pedestal is provided in said output signal; and a differential amplifier having push-pull input and output circuits with its input circuit coupled to said first-named push-pull signal output circuit whereby gating transients in said output signal are reduced.

2. The combination of claim 1 further comprising selectively variable resistance means coupled to the control element of one only of said gating valve means for varying the bias thereon thereby to equalize the amplitudes of the gating pedestals appearing at the second elements of said pair of gating valve means.

3. The combination of claim 1 further comprising selectively variable capacitance means coupled to the control element of one only of said gating valve means for equalizing the switching speeds of said pair of gating valve means thereby to synchronize the gating transients appearing at the second elements of said pair of gating valve means.

4. A gating circuit comprising: a pair of gating tubes each having at least cathode, control grid and plate elements; a push-pull input circuit coupled to said gating tube control grids for applying an input signal to be gated respectively thereto 180° out of phase; a push-pull signal output circuit coupled to the plates of said gating tubes; a pedestal cancelling tube having at least cathode, control grid and plate elements; a gating signal circuit coupled to said pedestal cancelling tube control grid for applying a gating signal thereto; said pedestal cancelling tube being conductive responsive to application of a said gating signal to said control grid thereof and non-conductive in the absence of a gating signal; a potentiometer having its ends respectively connected to the cathodes of said pair of gating tubes and having its sliding element connected to a source of negative potential by a first resistor; the cathode of said pedestal cancelling tube being connected to the sliding element of said potentiometer whereby conduction of said pedestal cancelling tube responsive to said gating signal causes said pair of gating tubes to be cut-off thereby gating-off said input signal; second and third resistors respectively connecting the plate of said pedestal cancelling tube to the plates of said pair of gating tubes; a fourth resistor connecting said plate of said pedestal cancelling tube to a source of positive plate potential; fifth and sixth resistors serially connected across the plates of said pair of gating tubes; a seventh resistor connected between the midpoint between said fifth and sixth resistors and said source of positive potential; said second through seventh resistors being proportioned so that the respective potentials of said plates of said pair of gating tubes are substantially the same when said tubes are conducting with said pedestal cancelling tube cut-off, and when said pair of gating tubes are cut-off with said pedestal cancelling tube conducting whereby a minimum gating pedestal is provided in said output signal; a differential amplifier having a pair of tubes each having at least cathode, control grid and plate elements; a push-pull input circuit coupled to said control grids of said pair of differential amplifier tubes; and a push-pull output circuit coupled to said plates of said pair of differential amplifier tubes; said differential amplifier input circuit being coupled to said pair of gating tubes output circuit whereby gating transients in said output signal are substantially reduced.

5. The combination of claim 4 further comprising selectively variable resistance means coupled to the control grid of one only of said gating tubes for varying the bias thereon thereby to equalize the amplitudes of the gating pedestals appearing at the plates of said pair of gating tubes, and selectively variable capacitance means coupled to the control grid of the other only of said gating tubes for equalizing the switching speeds of said pair of gating tubes thereby to synchronize the gating transients appearing at the plate of said pair of gating tubes.

(References on following page)

References Cited in the file of this patent

UNITED STATES PATENTS

| | | |
|---|---|---|
| 1,892,924 | Babler | Jan. 3, 1933 |
| 1,931,648 | Dyksterhuis | Oct. 24, 1933 |
| 1,948,303 | Lavoie | Feb. 20, 1934 |
| 1,985,946 | Miessner | Jan. 1, 1935 |
| 2,455,616 | Shepard | Dec. 7, 1948 |
| 2,666,179 | Maxwell | Jan. 12, 1954 |
| 2,802,069 | Weber | Aug. 6, 1957 |

FOREIGN PATENTS

| | | |
|---|---|---|
| 630,123 | Great Britain | Oct. 5, 1949 |

OTHER REFERENCES

"Radio Engineering," Terman, McGraw-Hill Book Comp. Inc., 1937, second edition (pages 305–309 relied on).

Grosdoff: "Electronic Counters," R.C.A. Review, September 1946, vol. VII, No. 3, pages 438 to 447 (page 445 relied on).